US012720522B2

(12) United States Patent
Qiao et al.

(10) Patent No.: US 12,720,522 B2
(45) Date of Patent: Aug. 25, 2026

(54) AI OPERATION PROCESSING METHOD AND RELATED APPARATUS

(71) Applicant: HUAWEI TECHNOLOGIES CO., LTD., Shenzhen (CN)

(72) Inventors: Yunfei Qiao, Hangzhou (CN); Jian Wang, Hangzhou (CN); Yinggang Du, Shenzhen (CN); Rong Li, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 18/523,611

(22) Filed: Nov. 29, 2023

(65) Prior Publication Data

US 2024/0107514 A1 Mar. 28, 2024

Related U.S. Application Data

(63) Continuation of application No. PCT/CN2022/095494, filed on May 27, 2022.

(30) Foreign Application Priority Data

May 31, 2021 (CN) ......................... 202110603249.1

(51) Int. Cl.
*H04W 72/121* (2023.01)
*H04W 24/02* (2009.01)
*H04W 72/20* (2023.01)

(52) U.S. Cl.
CPC ......... *H04W 72/121* (2013.01); *H04W 24/02* (2013.01); *H04W 72/20* (2023.01)

(58) Field of Classification Search
CPC ... H04W 72/121; H04W 24/02; H04W 72/20; H04W 4/70; H04W 4/02; H04W 4/08;
(Continued)

(56) References Cited

U.S. PATENT DOCUMENTS

2015/0003315 A1* 1/2015 Chen .................... H04W 72/30 370/312
2020/0229092 A1* 7/2020 Wu ...................... H04W 76/28
(Continued)

OTHER PUBLICATIONS

Song et al., "Artificial intelligence enabled internet of things: Network architecture and spectrum access", IEEE Computational Intelligence Magazine, Feb. 2020, 44-51.

*Primary Examiner* — Nimesh Patel
(74) *Attorney, Agent, or Firm* — Fish & Richardson P.C.

(57) ABSTRACT

The present disclosure relates to artificial intelligence (AI) operation processing methods apparatuses. One example method includes obtaining a first group identifier, obtaining a trigger message sent by a network device, where the trigger message includes first control information, the first control information indicates a first time-frequency resource, the first time-frequency resource carries N pieces of first scheduling information, each of the N pieces of first scheduling information includes a respective second group identifier and respective AI operation information and indicates a terminal device in a user group indicated by the respective second group identifier to perform an AI operation corresponding to the respective AI operation information, determining target AI operation information when the first group identifier matches a target group identifier, and starting a target AI operation based on the target AI operation information.

16 Claims, 10 Drawing Sheets

(58) Field of Classification Search

CPC ....... H04W 4/50; H04W 76/28; H04W 92/18; H04W 72/25; H04W 4/40; H04W 76/14; H04W 72/02; H04W 72/0446; H04W 72/541; H04W 72/04; H04W 72/0453; H04W 48/18; H04W 12/08; H04W 72/27; H04W 36/30; H04W 52/0245; H04W 72/12; H04W 72/51; H04W 4/029; H04W 16/10; H04W 52/0212; H04W 72/50; H04W 28/0236; H04W 36/36; H04W 74/04; H04W 72/54; H04W 74/002; H04W 74/006; H04W 8/245; H04W 24/10; H04W 88/085; H04W 24/04; H04W 72/23; H04W 72/21; H04W 72/232; H04W 64/00; H04W 16/28; H04W 52/0206; H04W 72/0473; H04W 72/231; H04W 84/045; H04W 8/186; H04W 48/12; H04W 48/14; H04W 74/004; H04W 12/77; H04W 28/00; H04W 36/0007; H04W 28/16; H04W 28/0231; H04W 28/0215; H04W 36/322; H04W 36/38; H04W 72/044; H04W 28/26; H04W 12/63; H04W 52/0258; H04W 4/027; H04W 36/32; H04W 36/0072; H04W 36/00692; H04W 36/0066; H04W 16/18; H04W 16/12; H04W 16/02; H04W 60/04; H04W 48/04; H04W 16/04; H04W 28/0268; H04W 72/542; H04W 72/40; H04W 64/003; H04W 40/08; H04W 72/046; H04W 52/0216; H04W 4/06; H04W 2/04; G06F 2209/502; G06F 9/5027; G06F 9/5061; H04L 67/10; H04L 12/12; H04L 41/0893; H04L 41/0853; H04L 41/12; H04L 41/16; H04L 1/1812; H04L 5/0048; H04L 1/0026; H04L 1/1854; H04L 5/0023; H04L 1/1887; H04L 43/065; H04L 41/5009; H04L 63/10; H04L 1/1883; H04L 25/0224; H04L 41/0894; H04L 5/006; H04L 5/0096; H04L 63/105; H04L 67/535; H04L 9/40; H04L 1/04; H04L 1/06; H04L 2209/80; H04L 25/0254; H04L 27/26; H04L 27/2601; H04L 27/261; H04L 5/0005; H04L 5/0053; H04L 5/001; H04L 47/2475; H04L 5/0037; H04L 5/0007; H04L 43/16; H04L 41/147; H04L 43/08; H04L 25/0202; H04L 27/26035; G06N 3/084; G06N 3/092; G06N 20/00; G06N 3/045; G06N 3/08; G06N 3/0464; G06N 3/02; G06N 3/044; G06N 3/09; G06N 3/042; G06N 5/04; G06N 3/0475; G06N 5/01; G06N 3/088; Y02D 30/70; H04B 17/345; H04B 7/0626; H04B 7/06952; H04B 17/318; H04B 17/328; H04B 17/373; H04B 7/024; H04B 7/0617; H04B 17/3913; H04B 17/309; H04B 7/0695; H04B 7/0413; H04B 7/0452; H04B 7/204; H04B 7/0639; H04B 7/0632; H04B 7/0691; H04B 7/0408; H04B 7/212; H04B 7/24; H04J 11/005; H04J 11/0063; H04J 11/00; H04J 11/0023; H04J 11/003; H04J 11/0053; H04J 3/16; H04J 13/18; H04J 14/0298; H04J 13/12; H04J 2011/0003; H04J 2203/0091; H04J 2211/005; G06V 10/82; G06V 40/166; G06V 40/172; G06V 40/20

See application file for complete search history.

(56) References Cited

U.S. PATENT DOCUMENTS

| | | | | |
|---|---|---|---|---|
| 2021/0125075 | A1* | 4/2021 | Lee | G06N 3/088 |
| 2021/0158773 | A1* | 5/2021 | Cho | G06F 3/011 |
| 2021/0345072 | A1* | 11/2021 | Selvanesan | H04W 4/02 |

* cited by examiner

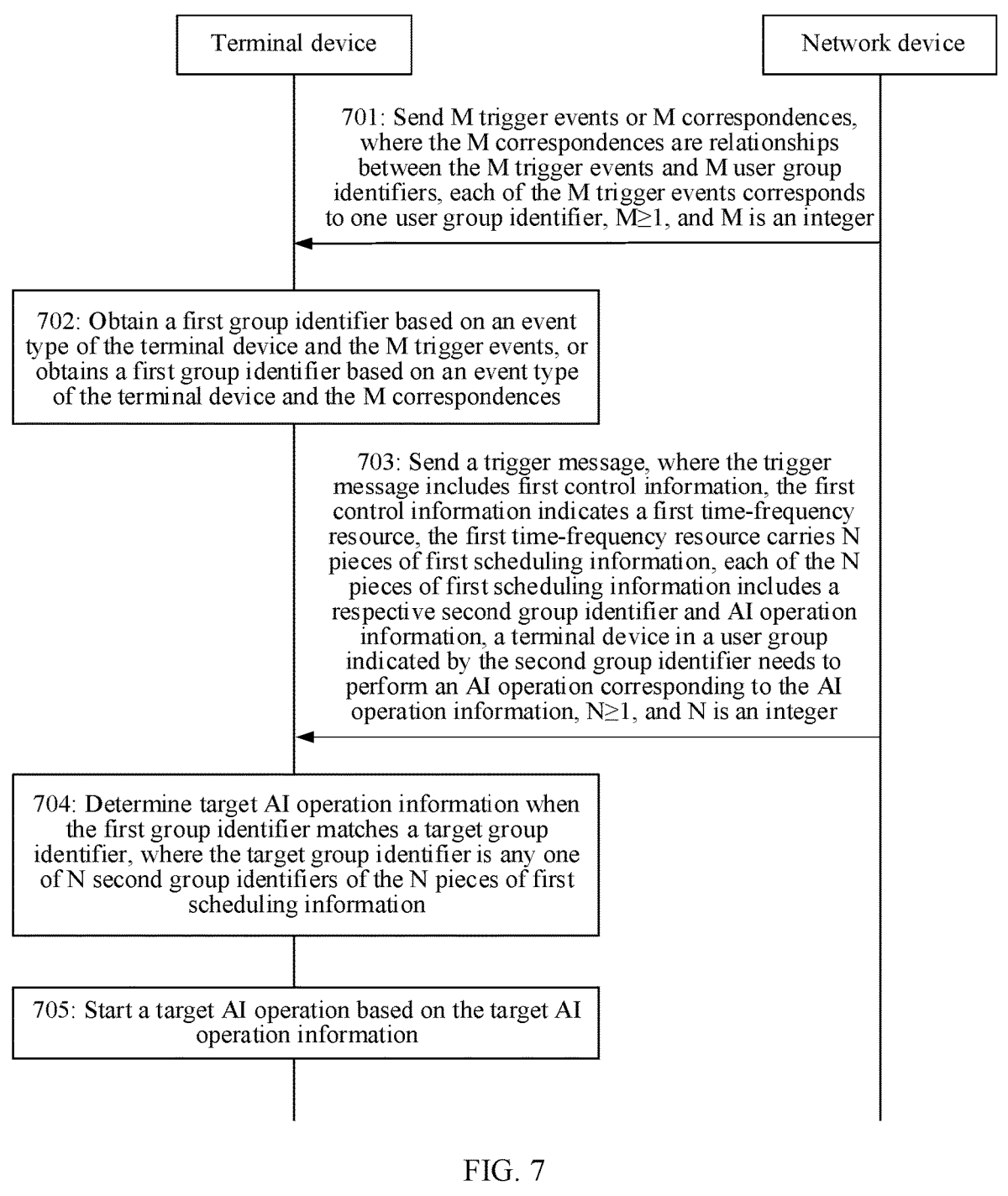

Terminal device

Network device

701: Send M trigger events or M correspondences, where the M correspondences are relationships between the M trigger events and M user group identifiers, each of the M trigger events corresponds to one user group identifier, M≥1, and M is an integer 702: Obtain a first group identifier based on an event type of the terminal device and the M trigger events, or obtains a first group identifier based on an event type of the terminal device and the M correspondences 703: Send a trigger message, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer 704: Determine target AI operation information when the first group identifier matches a target group identifier, where the target group identifier is any one of N second group identifiers of the N pieces of first scheduling information 705: Start a target AI operation based on the target AI operation information

FIG. 7

AI OPERATION PROCESSING METHOD AND RELATED APPARATUS

CROSS-REFERENCE TO RELATED APPLICATIONS

This application is a continuation of International Application No. PCT/CN2022/095494, filed on May 27, 2022, which claims priority to Chinese Patent Application No. 202110603249.1, filed on May 31, 2021. The disclosures of the aforementioned applications are hereby incorporated by reference in their entireties.

TECHNICAL FIELD

Embodiments of this application relate to the field of communication technologies, and specifically, to an AI operation processing method and a related apparatus.

BACKGROUND

In a future communication network, a quantity and types of terminal devices will increase explosively. A large amount of data collected, processed, and generated by the terminal devices will provide impetus for an application of artificial intelligence (AI) technologies. Currently, the academia has a large amount of research on application of the AI technologies to a network layer (such as network optimization, mobility management, resource allocation, and the like) and a physical layer (such as channel coding and decoding, channel prediction, a receiver, and the like). Common AI technologies include but are not limited to reinforcement learning, supervised learning, and unsupervised learning. To relieve computing pressure of a central node, in a distributed learning method, the central node usually delivers a dataset D to a distributed node; and the distributed node performs model training on the dataset D by using a local computing resource, and uploads the trained model W to the central node. In other words, the central node has all datasets, and the distributed node does not need to collect a local dataset. In addition, a computing capability of the distributed node is used to help the central node train a model, so that computing pressure of the central node can be offloaded.

However, in a current distributed architecture, each distributed node usually needs to keep online at all times, to interact with the central node. However, for some of the nodes, because of priorities or service types of the nodes, the nodes do not need to frequently interact with the central node, and may be switched to an offline state, to reduce power consumption. To optimize overall network performance, a plurality of users and a plurality of devices need to coordinate to execute a task.

Therefore, how to respond to and perform an AI operation in a timely manner after the distributed node is switched to the offline state becomes an urgent problem to be resolved.

SUMMARY

Embodiments of this application provide an AI operation processing method and a related apparatus. Through the method and the related apparatus, after a terminal device has been switched to an offline state, a network device can trigger, in a timely manner, the terminal device in the offline state to respond to and perform an AI operation, thereby participating in optimization of a network AI capability and improving network performance.

According to a first aspect, an embodiment of this application provides an AI operation processing method, where the method may be applied to a terminal device. The processing method may include: obtaining a first group identifier, where the first group identifier indicates a user group in which the terminal device is located; obtaining a trigger message sent by a network device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer; determining target AI operation information when the first group identifier matches a target group identifier, where the target group identifier is any one of N second group identifiers of the N pieces of first scheduling information; and starting a target AI operation based on the target AI operation information. In the foregoing manner, because the first scheduling information carries the second group identifier and the AI operation information, the network device sends the first scheduling information to the terminal device through the trigger message, to trigger the terminal device that is switched to an offline state to perform the target AI operation corresponding to the target AI operation information, thereby participating in optimization of a network AI capability and improving network performance.

In some optional embodiments, the processing method further includes: ignoring the N pieces of first scheduling information when the first group identifier does not match any one of the N second group identifiers.

In some other optional embodiments, before the determining target AI operation information, the processing method further includes: descrambling the first control information based on a preset AI operation identifier.

In some other optional embodiments, before the obtaining a first group identifier, the processing method further includes: sending geographical location information of the terminal device and/or first capability information of the terminal device to the network device, where the first capability information reflects a capability support status of the terminal device; and correspondingly, the obtaining a first group identifier includes: receiving a first group identifier sent by the network device, where the first group identifier is determined by the network device based on the geographical location information and/or the first capability information.

In some other optional embodiments, before the obtaining a first group identifier, the processing method further includes: receiving M trigger events or M correspondences sent by the network device, where the M correspondences are relationships between the M trigger events and M user group identifiers, each of the M trigger events corresponds to one user group identifier, M≥1, and M is an integer; and correspondingly, the obtaining a first group identifier includes: obtaining the first group identifier based on an event type of the terminal device and the M trigger events; or obtaining the first group identifier based on an event type of the terminal device and the M correspondences.

In some other optional embodiments, the AI operation corresponding to the AI operation information includes performing model uploading or performing channel data collection.

According to a second aspect, an embodiment of this application provides another AI operation processing method, where the processing method may be applied to a network device. The processing method may include: sending, to a terminal device, a first group identifier, M trigger events, or M correspondences, where the M correspondences are relationships between the M trigger events and M user group identifiers, the M trigger events or the M correspondences are used by the terminal device to determine the first group identifier, the first group identifier indicates a user group in which the terminal device is located, each of the M trigger events corresponds to one user group identifier, M≥1, and M is an integer; and sending a trigger message to the terminal device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer.

In some optional embodiments, the processing method may further include: scrambling the first control information based on a preset AI operation identifier.

In some optional embodiments, before the sending, to a terminal device, a first group identifier, the processing method further includes: receiving geographical location information of the terminal device and/or first capability information of the terminal device sent by the terminal device, where the first capability information reflects a capability support status of the terminal device; and determining the first group identifier based on the geographical location information and/or the first capability information.

In some optional embodiments, the trigger events include that a user local model is invalid, a user local model expires, and/or user local training data is invalid.

According to a third aspect, an embodiment of this application provides another AI operation processing method, where the processing method may be applied to a terminal device. The processing method may include: receiving DCI control information sent by a network device, where the DCI control information includes a first field and a second field, and the first field is different from the second field; determining, when a value of the first field is a first preset value, a first type identifier based on indication information of the second field, where the first type identifier identifies a type of an AI operation; and starting the AI operation based on the first type identifier.

In some optional embodiments, the determining, when a value of the first field is a first preset value, a first type identifier based on indication information of the second field includes: interpreting, when the value of the first field is the first preset value, the indication information of the second field based on a preset interpretation manner, to determine the first type identifier.

According to a fourth aspect, an embodiment of this application provides another AI operation processing method, where the processing method may be applied to a network device. The processing method may include: scrambling DCI control information by using C-RNTI information, where the DCI control information includes a first field and a second field, and the first field is different from the second field; and sending the scrambled DCI control information to a terminal device.

According to a fifth aspect, an embodiment of this application provides a terminal device. The terminal device may include: an obtaining module, configured to obtain a first group identifier, where the first group identifier indicates a user group in which the terminal device is located, where the obtaining module is configured to obtain a trigger message sent by a network device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer; and a processing module, configured to determine target AI operation information when the first group identifier matches a target group identifier, where the target group identifier is any one of N second group identifiers of the N pieces of first scheduling information, where the processing module is configured to start a target AI operation based on the target AI operation information.

In some optional embodiments, the processing module is further configured to: ignore the N pieces of first scheduling information when the first group identifier does not match any one of the N second group identifiers.

In some optional embodiments, the processing module is further configured to descramble, before determining the target AI operation information, the first control information based on a preset AI operation identifier.

In some optional embodiments, the terminal device further includes: a sending module, configured to send geographical location information of the terminal device and/or first capability information of the terminal device to the network device before the first group identifier is obtained, where the first capability information reflects a capability support status of the terminal device; and the obtaining module, configured to receive a first group identifier sent by the network device, where the first group identifier is determined by the network device based on the geographical location information and/or the first capability information.

In some optional embodiments, the obtaining module is further configured to: receive, before obtaining the first group identifier, M trigger events or M correspondences sent by the network device, where the M correspondences are relationships between the M trigger events and M user group identifiers, each of the M trigger events corresponds to one user group identifier, M≥1, and M is an integer; and obtain the first group identifier based on an event type of the terminal device and the M trigger events; or obtain the first group identifier based on an event type of the terminal device and the M correspondences.

In some optional embodiments, the AI operation corresponding to the AI operation information includes performing model uploading or performing channel data collection.

According to a sixth aspect, an embodiment of this application provides a network device. The network device may include: a sending unit, configured to send a first group identifier, and M trigger events or M correspondences to a terminal device, where the M correspondences are relationships between the M trigger events and M user group identifiers, the M trigger events or the M correspondences are used by the terminal device to determine the first group identifier, the first group identifier indicates a user group in which the terminal device is located, each of the M trigger events corresponds to one user group identifier, M≥1, and M is an integer, where the sending unit is configured to send a trigger message to the terminal device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer.

In some optional embodiments, the network device further includes a first processing unit, configured to scramble the first control information based on a preset AI operation identifier.

In some optional embodiments, the network device further includes: a receiving unit, configured to receive, before the first group identifier is sent to the terminal device, geographical location information of the terminal device and/or first capability information of the terminal device sent by the terminal device, where the first capability information reflects a capability support status of the terminal device; and a second processing unit, configured to determine the first group identifier based on the geographical location information and/or the first capability information.

In some optional embodiments, the trigger events include that a user local model is invalid, a user local model expires, and/or user local training data is invalid.

According to a seventh aspect, an embodiment of this application provides a terminal device, where the terminal device may include a memory, configured to store computer-readable instructions. The terminal device may further include a processor coupled to the memory, where the processor is configured to execute computer-readable instructions in the memory, to perform the processing method described in the first aspect, the third aspect, any possible implementation of the first aspect, or any possible implementation of the third aspect.

According to an eighth aspect, an embodiment of this application provides a network device, where the network device may include a memory, configured to store computer-readable instructions. The network device may further include a processor coupled to the memory, where the processor is configured to execute computer-readable instructions in the memory, to perform the processing method described in the second aspect, the fourth aspect, any possible implementation of the second aspect, or any possible implementation of the fourth aspect.

According to a ninth aspect, an embodiment of this application provides a computer-readable storage medium, including instructions, where when the instructions are run on a computer, the computer is enabled to perform the processing method according to the first aspect, the second aspect, the third aspect, the fourth aspect, or any possible implementation of the first aspect, any possible implementation of the second aspect, any possible implementation of the third aspect, or any possible implementation of the fourth aspect.

According to a tenth aspect, an embodiment of this application provides a computer program product including instructions, where when the computer program product is run on a computer, the computer is enabled to perform the processing method according to the first aspect, the second aspect, the third aspect, the fourth aspect, or any possible implementation of the first aspect, any possible implementation of the second aspect, any possible implementation of the third aspect, or any possible implementation of the fourth aspect.

According to an eleventh aspect, an embodiment of this application provides a chip system. The chip system may include a processor, configured to support a terminal device in implementing functions in the method described in the first aspect, the third aspect, or any possible implementation of the first aspect, or any possible implementation of the third aspect, or support a first device in implementing functions in the method described in the second aspect, the fourth aspect, or any possible implementation of the second aspect, or any possible implementation of the fourth aspect.

Optionally, with reference to the eleventh aspect, in a first possible implementation, the chip system may further include a memory, and the memory is configured to store program instructions and data that are necessary for the terminal device and the network device. The chip system may include a chip, or may include a chip and another discrete component. The chip system may include an application-specific integrated circuit (ASIC), a field programmable gate array (FPGA), another programmable logic device, or the like. Further, the chip system may further include an interface circuit and the like.

According to the foregoing technical solutions, it can be learned that embodiments of this application have the following advantages:

In this embodiment of this application, the trigger message includes first control information, the first control information indicates a first time-frequency resource, the first time-frequency resource carries N pieces of first scheduling information, each of the N pieces of first scheduling information includes a respective second group identifier and AI operation information, and a terminal device in a user group indicated by the second group identifier needs to perform an AI operation corresponding to the AI operation information. Therefore, after obtaining the first group identifier and the trigger message sent by the network device, the terminal device can determine the target AI operation information when the first group identifier matches the target group identifier, and start the target AI operation based on the target AI operation information. In the foregoing manner, because the first scheduling information carries the second group identifier and the AI operation information, the network device sends the first scheduling information to the terminal device through the trigger message, to trigger the terminal device that is switched to an offline state to perform the target AI operation corresponding to the target AI operation information, thereby participating in optimization of a network AI capability and improving network performance.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application.

FIG. 7 is a schematic flowchart of another AI operation processing method according to an embodiment of this application;

DESCRIPTION OF EMBODIMENTS

Figure 1A:
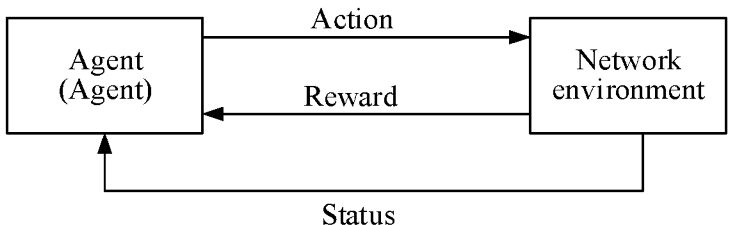
FIG. 1*a* is a schematic diagram of reinforcement learning.

Embodiments of this application provide an AI operation processing method and a related apparatus. Through the method and the related apparatus, after a terminal device has been switched to an offline state, a network device can trigger, in a timely manner, the terminal device in the offline state to respond to and perform an AI operation, thereby participating in optimization of a network AI capability and improving network performance.

The following clearly describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in orders except the order illustrated or described herein. Moreover, the terms "include", "have", or any other variant thereof are intended to cover non-exclusive inclusion. In this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent: a, b, c, a and b, a and c, b and c, or a, b, and c, where a, b, and c may be singular or plural. It should be noted that "at least one item (piece)" may also be explained as "one item (piece) or more items (pieces)".

In a future communication network, the number and types of terminal devices will increase explosively. A large amount of data collected, processed, and generated by the terminal devices will provide impetus for the application of AI technologies. Currently, the academic community has a large amount of research on applying the AI technologies to a network layer (such as network optimization, mobility management, resource allocation, and the like) and a physical layer (such as channel coding and decoding, channel prediction, a receiver, and the like). Common AI technologies include but are not limited to reinforcement learning, supervised learning, and unsupervised learning.

The described reinforcement learning is learning performed by an agent in a manner of interacting with an environment. The agent performs an action on the environment based on a status fed back by the environment, to obtain a reward and a status at a next moment. An objective is to enable the agent to accumulate a maximum reward in a period of time. For details, refer to a schematic diagram of reinforcement learning shown in FIG. 1*a*. In addition, the reinforcement learning is different from the supervised learning in that no training set is required. In reinforcement learning, reinforcement signals (usually scalar signals) provided by the environment are used to evaluate the quality of the generated action, instead of telling the reinforcement learning system how to generate the correct action. Because an external environment provides little information, the agent needs to learn from its own experience. In this way, the agent gains knowledge in an action-evaluation environment and improve action plans to adapt to the environment. Common reinforcement learning algorithms include Q-learning, policy gradient, and actor-critic. Currently, a commonly used reinforcement learning algorithm is deep reinforcement learning (DRL). It combines reinforcement learning with deep learning, and uses a neural network to model policy/value functions to adapt to larger input/output dimensions.

Different from the reinforcement learning, the supervised learning aims to learn a mapping relationship between input (data) and output (label) in a given training set (including a plurality of pairs of input data and labels). In addition, it is expected that the mapping relationship can be further applied to data outside the training set. The described training set is a set of correct input and output pairs.

Figure 1B:
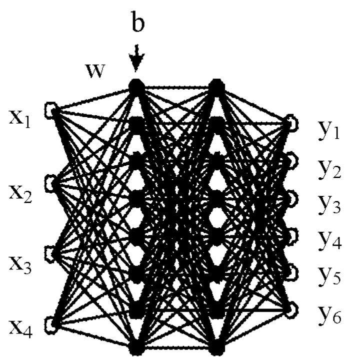
FIG. 1*b* is a schematic diagram of a fully-connected neural network.

A fully-connected neural network is used as an example to describe a neural network model and a training method. A fully-connected neural network is also referred to as a multi-layer perceptron (MLP). As shown in FIG. 1*b*, one MLP includes one input layer, one output layer, and a plurality of hidden layers. Each layer includes a plurality of nodes, which are referred to as neurons. Neurons at two adjacent layers are connected in pairs. Considering the neurons at the two adjacent layers, an output h of a neuron at a lower layer is obtained through a weighted sum of all neurons x at an upper layer that are connected to the neuron at the lower layer and inputting the weighted sum into an activation function. The operations described above may be expressed by using a matrix as follows:

$$h=f(wx+b)$$

w represents a weight matrix, b represents an offset vector, and f represents the activation function. An output of the corresponding neural network may be recursively expressed as follows:

$$y=f_n(w_n f_{n-1}(\ldots)+b_n)$$

Briefly, the neural network may be understood as a mapping relationship from an input dataset to an output dataset. Generally, a neural network is randomly initialized, and a process of obtaining the mapping relationship from random w and b by using existing data is referred to as training on a neural network.

Figure 1C:
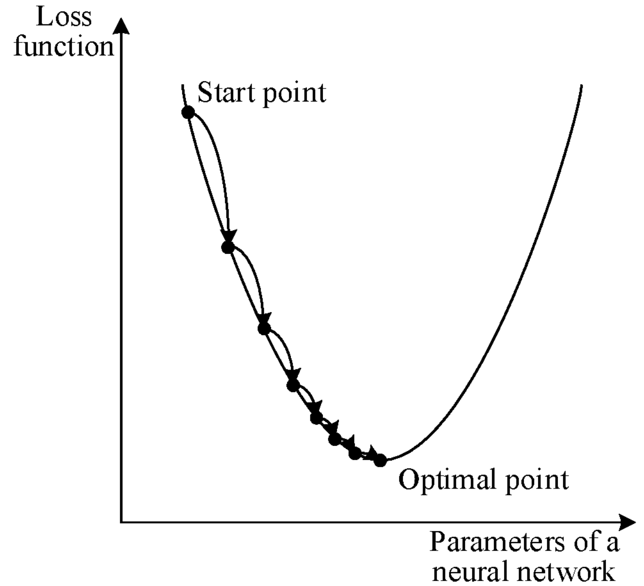
FIG. 1*c* is a schematic diagram of optimization of a loss function.

A specific training manner is to evaluate an output result of the neural network by using a loss function, and back propagate an error. By using a gradient descent method, w and b may be iteratively optimized until the loss function reaches a minimum value. For understanding, refer to a schematic diagram of optimization of a loss function shown in FIG. 1c.

The described gradient descent process may be expressed as:

$$\theta \leftarrow \theta \leftarrow \eta \frac{\partial L}{\partial \theta}$$

θ is a parameter to be optimized (for example, w and b), Lis a loss function, and η is a learning rate, and is used to control a gradient descent step.

Figure 1D:
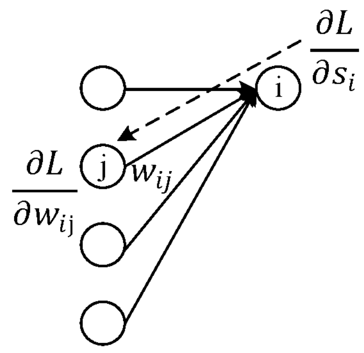
FIG. 1*d* is a schematic diagram of back propagation.

The described back propagation process uses a chain method for calculating a bias derivative. To be specific, a gradient of a parameter of a previous layer may be obtained by recursive calculation of a gradient of a parameter of a next layer. For details, refer to FIG. 1d. A corresponding formula for calculating the bias derivative may be expressed as follows:

$$\frac{\partial L}{\partial w_{ij}} = \frac{\partial L}{\partial s_i}\frac{\partial s_i}{\partial w_{ij}}$$

$w_{ij}$ is a weight of a node j and a node i, and $s_i$ is an input weighted sum on the node i.

Figure 1E:
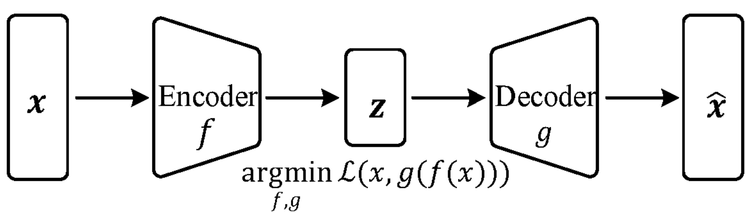
FIG. 1*e* is a diagram of a structure of a self-coder.

In addition, the described unsupervised learning may include, but is not limited to, a self-coder, and the like. The described self-coder is a common AI technology in the computer science field. For details, refer to a diagram of a structure of a self-coder shown in FIG. 1e for understanding. It can be learned from FIG. 1e that, input data x is mapped/compressed to a variable in a latent space by using a ƒ function, and then original data is restored from the variable z in the latent space by using a g function. The ƒ function and the g function may be implemented by using the neural network. Therefore, an optimization objective may be searching for parameters of the ƒ function and the g function, so that an error of restored data is minimized. Tasks completed by the encoder may also be considered as supervised learning processes with known labels (generally input data). Generally, a task completed by a communication system is very similar to a self-coder. The entire communication system may be similar to a limited self-coder, where a transmitter is an encoder, and a receiver is a decoder. For a wireless communication system, an impact generated by a channel may be superimposed in the latent space.

Figure 2:
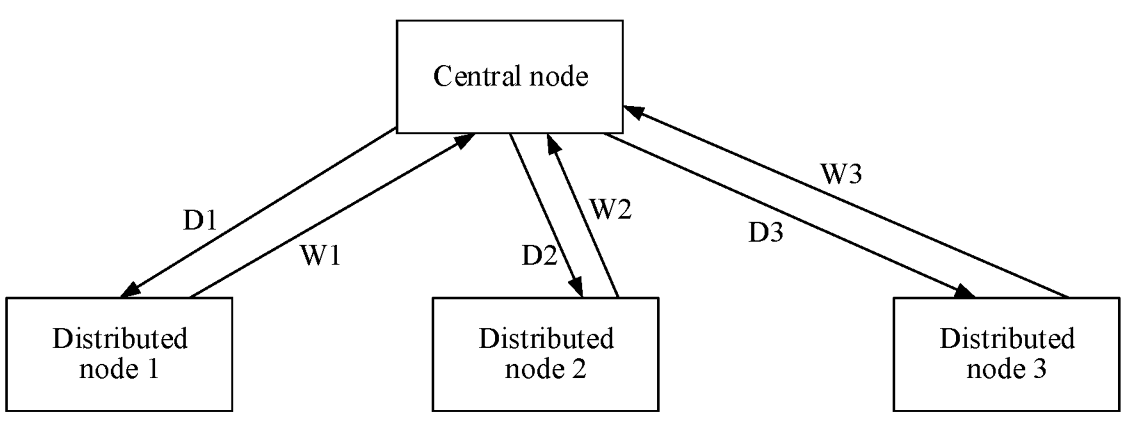
FIG. 2 is a schematic diagram of a distributed learning framework.

In a wireless communication system, to optimize the overall network performance, a plurality of users and a plurality of devices need to coordinate to execute a task. FIG. 2 is a schematic diagram of a distributed learning framework. It can be seen from FIG. 2 that, to relieve computing pressure of a central node, in a distributed learning, the central node usually delivers a dataset D to the distributed node. For example, the central node sends a dataset D1 to a distributed node 1, sends a dataset D2 to a distributed node 2, and sends a dataset D3 to a distributed node 3. Then, the distributed node performs model training on the obtained dataset D by using a local computing resource, and uploads the trained model W to the central node. For example, the distributed node 1, the distributed node 2, and the distributed node 3 respectively upload a trained model W1, a trained model W2, and a trained model W3 to the central node. That is, the central node has all datasets, and the distributed node does not need to collect a local dataset. In addition, a computing capability of the distributed node is used to help the central node train a model, so that computing pressure of the central node can be offloaded.

However, in a current distributed architecture, each distributed node usually needs to keep online at all times, to interact with the central node. However, for some of the nodes, because of a priority or a service type of the nodes, the nodes do not need to frequently interact with the central node, and may be switched to an offline state, to reduce power consumption. To optimize the overall network performance, a plurality of users and a plurality of devices need to coordinate to execute a task. Therefore, how to respond to and perform an AI operation in a timely manner after the distributed node is switched to the offline state becomes an urgent problem to be resolved.

Figure 3:
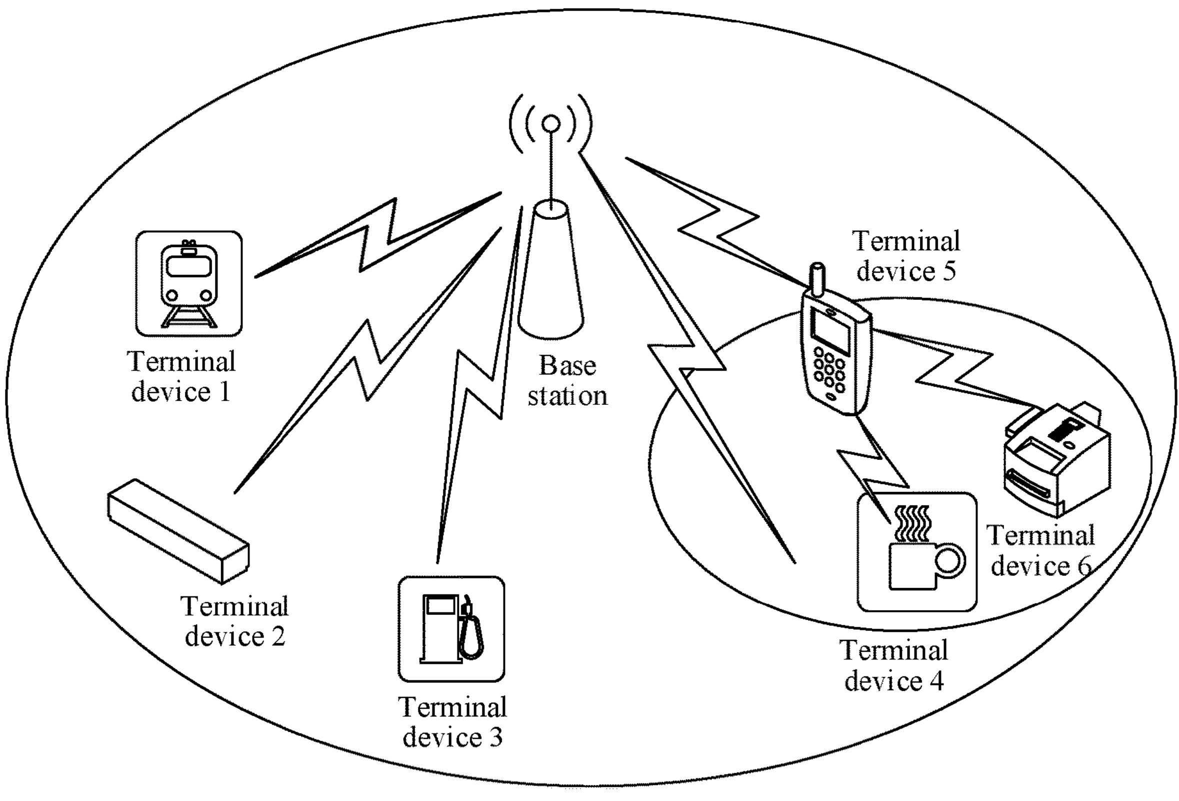
FIG. 3 is a schematic diagram of a communication system architecture according to an embodiment of this application.

Based on this, to resolve the foregoing described problem, an embodiment of this application provides an AI operation processing method. The processing method may be applied to a wireless communication system such as a 5th generation mobile network (5G), satellite communication, or a short range communication. Through the method, after a terminal device has been switched to an offline state, a network device can trigger, in a timely manner, the terminal device in the offline state to respond to and perform an AI operation, thereby participating in optimization of a network AI capability and improving network performance. FIG. 3 is a schematic diagram of a communication system architecture according to an embodiment of this application. It can be learned from FIG. 3 that the communication system architecture usually includes cells. Each cell includes one base station (BS) and at least one terminal device (for example, a terminal device 1 to a terminal device 6). The base station may provide a communication service for the at least one terminal device. In addition, the wireless communication system may also perform point-to-point communication. For example, a plurality of terminal devices communicate with each other.

The terminal device 1 is used as an example. If the terminal device 1 does not need to keep in an online state all the times to interact with a network device, the terminal device 1 may be switched to an offline state first. In this case, if the base station wants the terminal device 1 that has been switched to the offline state to participate in optimization of a network AI capability, the base station may send a trigger message to the terminal device 1, so that the terminal device 1 can determine, based on control information carried in the trigger message, whether to perform an AI operation. In this way, when determining to perform the AI operation, the terminal device 1 can participate in optimization of the network AI capability in a timely manner, to improve network performance. It should be noted that the terminal device 1 is used only as an example for description herein. In actual application, another offline terminal device may be further triggered. This is not limited herein.

It should be noted that the base station described in FIG. 3 may include a central unit (CU) and a distributed unit (DU). The CU and the DU may be placed in different places. For example, the DU is placed remotely in a high-traffic area, and the CU is placed in a central equipment room. Alternatively, the CU and the DU may be placed in a same equipment room. Alternatively, the CU and the DU may be different components in a rack.

In addition, the described base station is an apparatus that is deployed in a radio access network to provide a wireless communication function for a terminal device, and may be presented in different forms, for example, a macro base station, a micro base station (also referred to as a small cell), a pico station (Pico, pico cell), a relay station, an access point, and the like. This is not limited in this embodiment of this application. In systems that use different radio access technologies, names of devices having a base station function may be different. For example, in an LTE system, a device is referred to as an evolved NodeB (eNB or eNodeB); and in a 3rd generation (3G) system, a device is referred to as a NodeB. It should be understood that, with evolution of future wireless communication technologies, for example, 6G and 7G, new names for base stations may also appear in the future. However, different names of base stations do not affect application of embodiments of this application to the base station. The apparatus that provides a wireless communication function for the terminal device may be collectively referred to as a network device or a base station. For ease of description, only the network device is used as an example for description in embodiments of this application. In addition, the described network device may be understood as the central node described in FIG. 2.

The described terminal device may include various handheld devices, in-vehicle devices, wearable devices, computing devices, other processing devices connected to a wireless modem, notebook computers, subscriber units, cellular phones, smartphones, wireless data cards, personal digital assistant (PDA) computers, tablet computers, wireless modems (modem), handheld devices (handheld), laptop computers, and cordless phones that have a wireless communication function, or wireless local loop (WLL) stations, machine type communication (MTC) terminals, customer-premises equipment (CPE), or other devices that can access the network. The terminal device and the access network device communicate with each other by using an air interface technology.

In addition, in addition to 5G and satellite communication, the described wireless communication system may further include but is not limited to a narrow band-internet of things (NB-IOT), a global system for mobile communications (GSM), an enhanced data rate for GSM evolution (EDGE), a wideband code division multiple access (WCDMA), a code division multiple access (CDMA2000), a time division-synchronization code division multiple access (TD-SCDMA), a long term evolution (LTE), three application scenarios of a next generation 5G mobile communication system (enhanced mobile broadband (eMBB), ultra reliable low latency communication (URLLC), enhanced massive machine type communication (eMTC)), and future emergence such as 6G and 7G, which are not limited herein.

Figure 4:
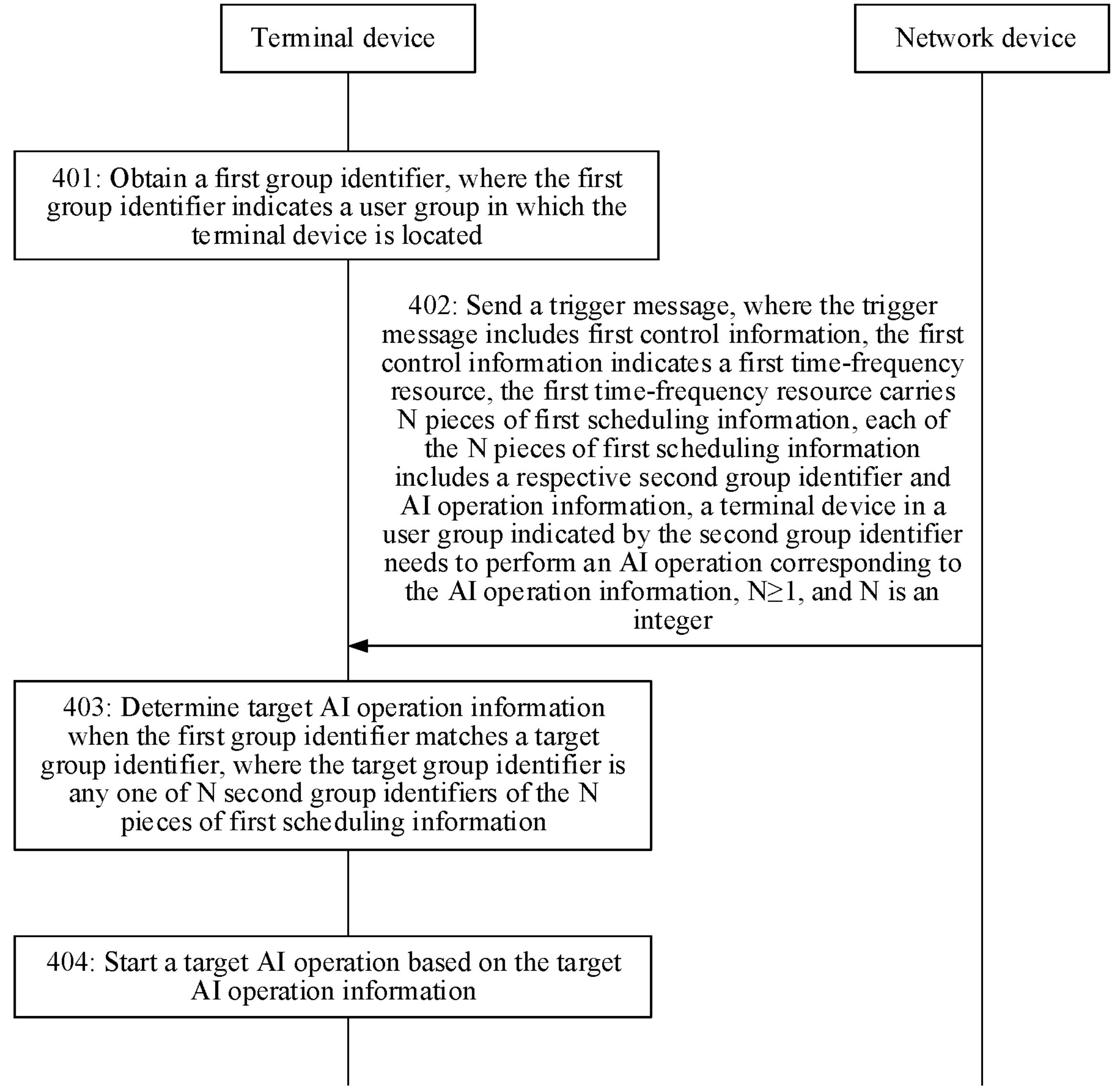
FIG. 4 is a schematic flowchart of an AI operation processing method according to an embodiment of this application.

For ease of understanding, FIG. 4 is a schematic flowchart of an AI operation processing method according to an embodiment of this application. It can be learned from FIG. 4 that the AI operation processing method may include the following steps.

401: A terminal device obtains a first group identifier, where the first group identifier indicates a user group in which the terminal device is located.

In this example, for a plurality of terminal devices, the plurality of terminal devices may be grouped, so that each user group may be represented by a corresponding group identifier. The first group identifier described above may indicate the user group in which the terminal device is located, that is, reflect the user group into which the terminal device is classified.

It should be noted that the terminal device may obtain the first group identifier from the network device, or may obtain the first group identifier through monitoring by the terminal device. For details, refer to content described in FIG. 6 and FIG. 7 subsequently for understanding. Details are not described herein again.

402: The network device sends a trigger message to the terminal device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer.

In this example, to enable the terminal device that has entered an offline state to respond to the AI operation in a timely manner, the network device may trigger the terminal device that has entered the offline state as required. To be specific, the network device needs to send the trigger message to the terminal device, to trigger the terminal device to start the AI operation.

Specifically, the network device may configure the first control information on a preset first time-frequency resource at a moment TI, so that the first control information can indicate the first time-frequency resource. However, terminal devices allocated to different user groups may perform different AI operations. Therefore, the first time-frequency resource carries the N pieces of first scheduling information, so that each of the N pieces of first scheduling information may include the respective second group identifier and the AI operation information of the N pieces of first scheduling information, and the terminal device in the user group indicated by the second group identifier needs to perform the AI operation corresponding to the AI operation information.

In this way, after sending the trigger message to the terminal device on the time-frequency resource (TO), the network device may trigger the terminal device to determine whether to perform a corresponding AI operation.

In some optional examples, the processing method may further include: The network device scrambles the first control information based on a preset AI operation identifier.

It should be noted that the described preset AI operation identifier may be understood as an identifier such as a scrambling ID (for example, an AI-ID), and the network device may select one from Reserved RNTI fields (for example, FFF0 to FFFD) as the scrambling ID, for example, FFFD. In this way, the first control information is scrambled by using the preset AI operation identifier, so that it can be ensured that the first control information is not tampered with in a transmission process, and data accuracy is ensured.

403: The terminal device determines target AI operation information when the first group identifier matches a target group identifier, where the target group identifier is any one of N second group identifiers of the N pieces of first scheduling information.

In this example, after the network device sends the trigger message to the terminal device, the terminal device may receive the trigger message. After receiving the trigger message, the terminal device may descramble the first control information in the trigger message. After descrambling the first control information, the terminal device may learn, based on an indication of the first control information, the N pieces of first scheduling information carried on the first time-frequency resource.

Then, the terminal device matches the first group identifier with the N second group identifiers of the N pieces of first scheduling information. If the N second group identifiers include a group identifier that matches the first group identifier, that is, the target group identifier, it indicates that the terminal device needs to perform the corresponding AI operation. To be specific, the terminal device needs to start a target AI operation based on the target AI operation information.

It should be noted that the described target group identifier is any one of the N second group identifiers.

Optionally, in some other examples, the processing method may further include: ignoring the N pieces of first scheduling information when the first group identifier does not match any one of the N second group identifiers.

In other words, in a process of matching the first group identifier with the N second group identifiers of the N pieces of first scheduling information, the terminal device does not find that the N second group identifiers include a group identifier that matches the first group identifier. In this case, it indicates that the network device does not need to trigger the terminal device to respond to the AI operation. Therefore, the terminal device may ignore the N pieces of first scheduling information when the first group identifier does not match any one of the N second group identifiers.

404: The terminal device starts a target AI operation based on the target AI operation information.

In this example, after determining the target AI operation information, the terminal device may start a corresponding target AI operation based on the target AI operation information.

Optionally, in some other examples, the AI operation corresponding to the described AI operation information may include performing model uploading or performing channel data collection. In actual application, the AI operation may be another operation. This is not limited herein.

Figure 5:
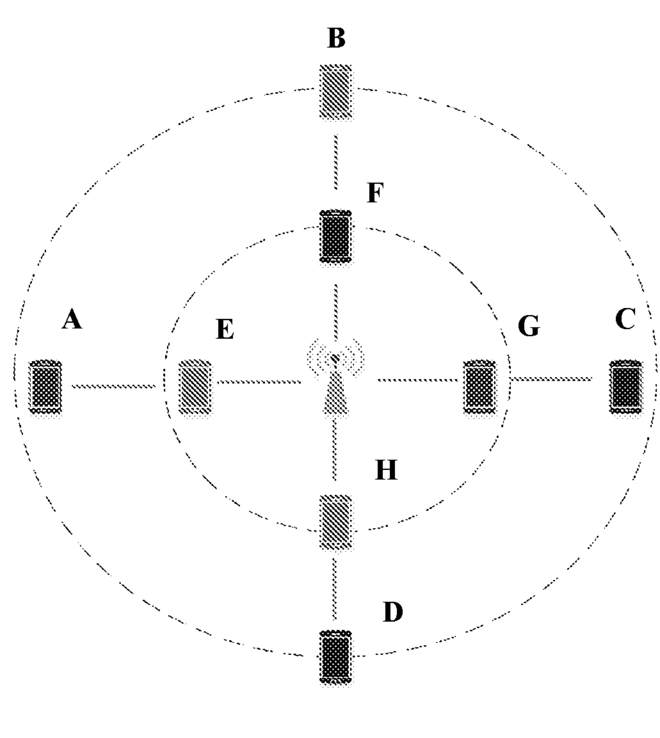
FIG. 5 is a schematic diagram of an application scenario according to an embodiment of this application.

For example, FIG. 5 is a schematic diagram of an application scenario according to an embodiment of this application. It can be learned from FIG. 5 that the application scenario may include a terminal device A to a terminal device H.

If the terminal device A to the terminal device H respectively obtain a first group identifier, refer to Table 1 for understanding.

TABLE 1

| Terminal device | First group identifier |
|---|---|
| A | R-Group ID |
| B | M-Group ID |
| C | B-Group ID |
| D | G-Group ID |
| E | X-Group ID |
| F | Q-Group ID |
| G | W-Group ID |
| H | B-Group ID |

In addition, if the network device configures three pieces of first scheduling information on the first time-frequency resource: scheduling information a, scheduling information b, and scheduling information c, the second group identifier and the AI operation information included in each piece of first scheduling information may be understood with reference to the following Table 2:

TABLE 2

| First scheduling information | Second group identifier | AI operation information |
|---|---|---|
| Scheduling information a | R-Group ID | Used to perform channel data collection |
| Scheduling information b | B-Group ID | Used to perform model uploading |
| Scheduling information c | G-Group ID | Used to perform model uploading |

Therefore, after the network device sends the trigger message to the terminal device A to the terminal device H, the terminal device A to the terminal device H may separately descramble the first control information in the trigger message, and then can learn of the three pieces of first scheduling information shown in Table 2. In this case, if the terminal device A to the terminal device H may compare the first group identifier obtained by the terminal device A to the terminal device H with the three second group identifiers, the terminal device A to the terminal device H learn which AI operation needs to be performed by the terminal device A to the terminal device H. For example, the terminal device A detects an R-Group ID, and therefore the terminal device A needs to perform an AI operation of channel data collection. Similarly, the terminal device C and the terminal device H detect a B-Group ID, and therefore the terminal devices C and H need to perform an AI operation of model uploading. The terminal device D detects a G-Group ID, and therefore the terminal device D needs to perform an AI operation of model uploading. However, the terminal devices B, E, F, and G do not detect a corresponding second group identifier, and may ignore the three pieces of first scheduling information.

It should be understood that FIG. 5, Table 1, and Table 2 are merely examples for description. In actual application, there may be another scenario. This is not limited in this embodiment of this application.

In this embodiment of this application, the trigger message includes first control information, the first control information indicates a first time-frequency resource, the first time-frequency resource carries N pieces of first scheduling information, each of the N pieces of first scheduling information includes a respective second group identifier and AI operation information, and a terminal device in a user group indicated by the second group identifier needs to perform an AI operation corresponding to the AI operation information. Therefore, after obtaining the first group identifier and the trigger message sent by the network device, the terminal device can determine the target AI operation information when the first group identifier matches the target group identifier, and start the target AI operation based on the target AI operation information. In the foregoing manner, because the first scheduling information carries the second group identifier and the AI operation information, the network device sends the first scheduling information to the terminal device through the trigger message, to trigger the terminal device that is switched to an offline state to perform the target AI operation corresponding to the target AI operation information, thereby participating in optimization of a network AI capability and improving network performance.

Figure 6:
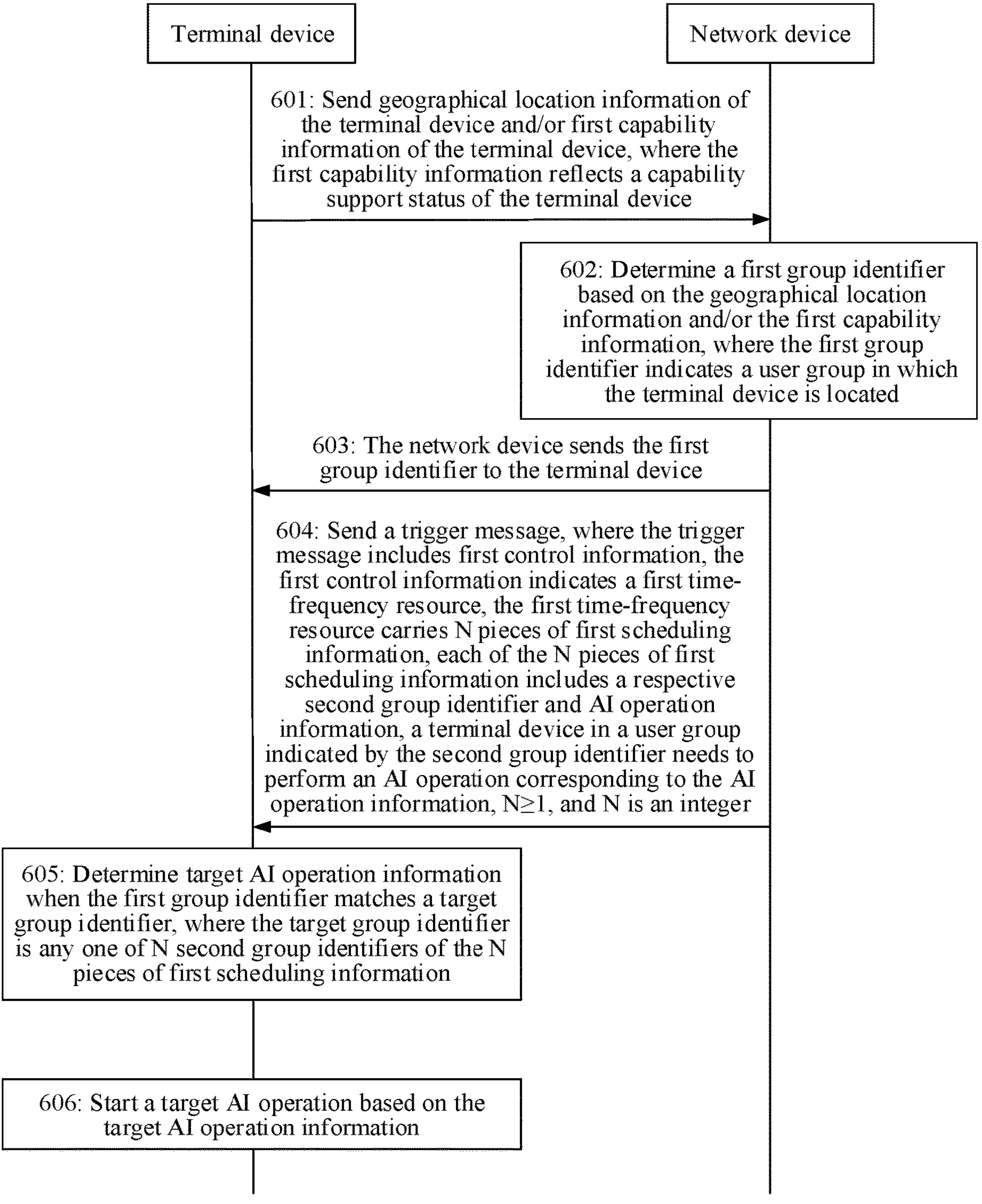
FIG. 6 is a schematic flowchart of another AI operation processing method according to an embodiment of this application.

The terminal device may obtain the first group identifier in different obtaining manners, for example, may obtain the first group identifier from the network device, or may obtain the first group identifier through monitoring by the terminal device. To further understand the AI operation processing method provided in this embodiment of this application, the following uses an example in which the first group identifier is obtained from the network device for description. FIG. 6 is a schematic flowchart of an AI operation processing method according to an embodiment of this application. It can be learned from FIG. 6 that the AI operation processing method may include the following steps.

601: The terminal device sends geographical location information of the terminal device and/or first capability information of the terminal device to the network device, where the first capability information reflects a capability support status of the terminal device.

In this example, the described address location information may indicate a location in which the terminal device is located. The address location information may include but is not limited to information such as address coordinates of the terminal device, a cell in which the terminal device is located, and a sector in which the terminal device is located. The described first capability information may reflect a capability support status of the terminal device, for example, a computing capability, a storage capability, a data collection capability, or the like, of the terminal device, or may be a maximum neural network scale, a local dataset type, or the like, supported by the terminal device. This is not limited in this embodiment of this application.

In addition, the terminal device may send the geographical location information and/or the first capability information to the network device during a random access process or after completing random access.

602: The network device determines a first group identifier based on the geographical location information and/or the first capability information, where the first group identifier indicates a user group in which the terminal device is located.

In this example, after receiving the geographical location information and/or the first capability information sent by the terminal device, the network device may determine the first group identifier based on the geographical location information and/or the first capability information.

It should be noted that each time the terminal device reports the geographical location information and/or the first capability information, the network device updates the first group identifier based on the geographical location information and/or the first capability information reported by the terminal device.

603: The network device sends the first group identifier to the terminal device.

In this example, after determining the first group identifier, the network device may send the first group identifier to the terminal device. Specifically, the network device may carry the first group identifier in an Msg4 message in the random access process, and feed back the Msg4 message to the terminal device. Alternatively, the network device may carry the first group identifier in a UE-specific RRC message after entering a connected state, and feed back the UE-specific RRC message to the terminal device. This is not specifically limited in this embodiment of this application.

604: The network device sends a trigger message to the terminal device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer.

605: The terminal device determines target AI operation information when the first group identifier matches a target group identifier, where the target group identifier is any one of N second group identifiers of the N pieces of first scheduling information.

606: The terminal device starts a target AI operation based on the target AI operation information.

In this embodiment, steps 604 to 606 may be specifically understood with reference to content described in steps 402 to 404 in FIG. 4. Details are not described herein again.

In this embodiment of this application, the network device groups the terminal devices, so that one or more terminal devices that are switched to an offline state can be triggered in batches to perform the target AI operation corresponding to the target AI operation information, thereby participating in optimization of a network AI capability and improving network performance.

To further understand the AI operation processing method provided in this embodiment of this application, the following uses an example in which the terminal device monitors the first group identifier. FIG. 7 is a schematic flowchart of another AI operation processing method according to an embodiment of this application. It can be learned from FIG. 7 that the AI operation processing method may include the following steps.

701: A network device sends M trigger events or M correspondences to a terminal device, where the M correspondences are relationships between the M trigger events and M user group identifiers, each of the M trigger events corresponds to one user group identifier, M≥1, and M is an integer.

In this example, there is a one-to-one correspondence between each trigger event and a user group identifier. Therefore, the network device may use the M trigger events as a grouping criterion, or may use the M correspondences as a grouping criterion. Then, the network device may send the grouping criterion to each terminal device in the service area through a broadcast message, so that each terminal device can receive the grouping criterion.

Specifically, in a manner in which the M trigger events are used as the grouping criterion, the described M trigger events may be understood with reference to the following Table 3:

TABLE 3

| Trigger event | |
|---|---|
| Event 1 | A user local model is invalid |
| Event 2 | A user local model expires |
| Event 3 | User local training data is invalid |
| . . . | . . . |

For the event 1, when the terminal device performs operations such as decoding and CQI feedback based on the local model, if a performance loss exceeds a threshold, it may be determined that a current user local model is invalid. For the event 2, when a duration since a time when a local model of the terminal device is updated last time exceeds a value set by a timer, it may be determined that a current user local model expires. Similarly, for the event 3, when a task that needs to be executed by the terminal device changes or an environment in which the terminal device is located changes, it may be determined that current user local training data is invalid. In this case, the network device needs to deliver a new dataset. It should be noted that, in addition to the foregoing described event 1, event 2, and event 3, the trigger event may further include another event in actual application. This is not limited herein.

Each trigger event corresponds to a user group identifier, and each trigger event and the corresponding user group identifier are arranged in sequence. Therefore, the network device sends the M trigger events to the terminal device, so that the terminal device can sort the received M trigger events, and then map the sorted M trigger events to the M user group identifiers. In this way, after determining an event type of the terminal device, the terminal device may determine a corresponding user group identifier based on relationships between the sorted M trigger events and the M user group identifiers, that is, determine the first group identifier.

In addition, in a manner in which the M correspondences are used as the grouping criterion, the described M correspondences may be understood with reference to the following Table 4:

TABLE 4

| Correspondence | |
|---|---|
| Trigger event 1 | User group identifier 1 |
| Trigger event 2 | User group identifier 2 |
| Trigger event 3 | User group identifier 3 |
| . . . | . . . |

As can be seen from Table 4, the trigger event 1 corresponds to the user group identifier 1, the trigger event 2 corresponds to the user group identifier 2, the trigger event 3 corresponds to the user group identifier 3, and so on, a trigger event M corresponds to a user group identifier M. The described trigger event 1, trigger event 2, trigger event 3, . . . , and trigger event M may be understood with reference to content described in Table 3. In this way, the network device sends the M correspondences to the terminal device, so that after determining the event type of the terminal device, the terminal device can directly determine a corresponding user group identifier based on the received M correspondences and the event type of the terminal device, that is, determine the first group identifier.

702: The terminal device obtains the first group identifier based on an event type of the terminal device and the M trigger events, or obtains the first group identifier based on an event type of the terminal device and the M correspondences.

In this example, after receiving the M trigger events or the M correspondences sent by the network device, the terminal device matches an event type of the terminal device with the M trigger events, to determine a matched trigger event. In addition, each trigger event corresponds to one user group identifier. Therefore, after determining the matched trigger event, the terminal device may obtain the first group identifier based on a one-to-one correspondence. Similarly, that the terminal device obtains the first group identifier based on an event type of the terminal device and the M correspondences may be understood with reference to content of step 701. Details are not described herein again.

It should be noted that, how the terminal device determines the event type of the terminal device may be understood with reference to content of the event 1 to the event 3 in step 702. Details are not described herein again.

703: The network device sends a trigger message to the terminal device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer.

704: The terminal device determines target AI operation information when the first group identifier matches a target group identifier, where the target group identifier is any one of N second group identifiers of the N pieces of first scheduling information.

705: The terminal device starts a target AI operation based on the target AI operation information.

In this embodiment, steps 703 to 705 may be specifically understood with reference to content described in steps 402 to 404 in FIG. 4. Details are not described herein again.

It may be understood that, in some other examples, the network device may alternatively carry AI operations for different trigger events in a semi-static configuration resource. The described semi-static configuration resource has a one-to-one mapping relationship with the trigger event.

In other words, if there are K time-frequency resources (K≥M), one time-frequency resource carries one trigger event, and a trigger event carried on each time-frequency resource can directly indicate an AI operation that needs to be performed by the terminal device.

In this embodiment of this application, the network device delivers a grouping rule to the terminal device, and the terminal device that is switched to the offline state performs grouping based on the grouping rule. In this way, after receiving the trigger message of the network device, the grouped terminal device responds to and performs the target AI operation corresponding to the target AI operation information. Therefore, the terminal device that is already in the offline state participates in optimization of a network AI capability, thereby improving network performance, and avoiding signaling overheads caused by centralized grouping of the network device.

Figure 8:
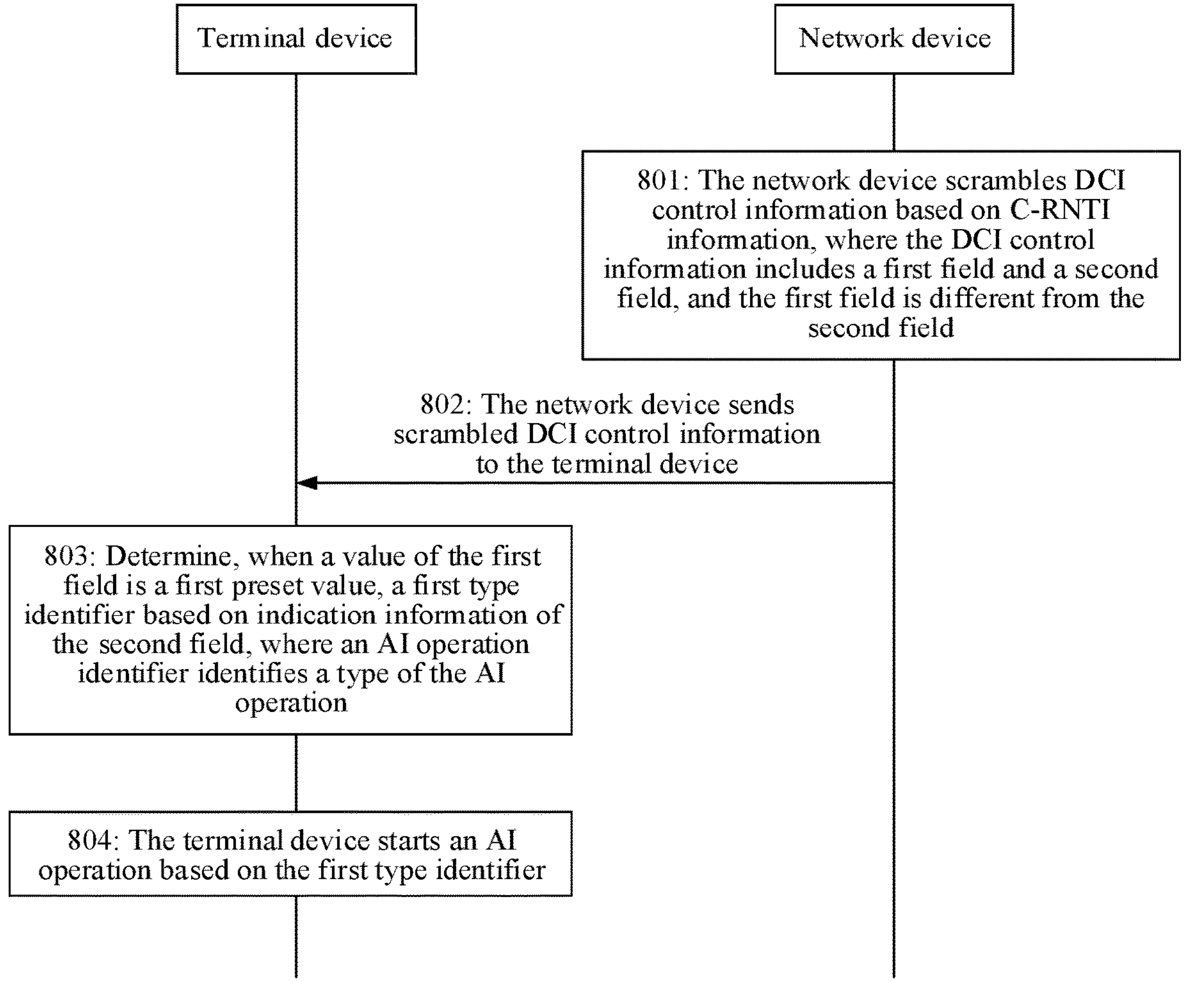
FIG. 8 is a schematic flowchart of another AI operation processing method according to an embodiment of this application.

FIG. 3 to FIG. 7 are mainly described from a perspective of triggering, by the network device, one or more terminal devices to perform an AI operation. Alternatively, triggering a single terminal device to perform an AI operation may be understood from the following embodiment described in FIG. 8. Specifically, FIG. 8 is a schematic flowchart of another AI operation processing method according to an embodiment of this application. It can be learned from FIG. 8 that the AI operation processing method may include the following steps.

801: The network device scrambles DCI control information based on C-RNTI information, where the DCI control information includes a first field and a second field, and the first field is different from the second field.

In this example, a type of each AI operation may be identified by using a different identifier. In this embodiment of this application, the type of the AI operation may be identified by using the first type identifier, for example, an AI-operation ID. For a single terminal device, the network device may trigger, by using DCI signaling, the terminal device to perform a corresponding AI operation. Specifically, the network device may directly reuse the C-RNTI information to scramble the DCI control information, so that a value of the first field in the DCI control information can indicate whether the terminal device needs to determine the first type identifier from different interpretation manners based on an indication of the second field.

It should be noted that the described DCI control information may be understood as DCI-1-0. The first field may be understood as a Frequency domain resource assignment field in the DCI-1-0. The described second field may be understood as a field other than the first field in the DCI-1-0.

802: The network device sends scrambled DCI control information to the terminal device.

In this example, after scrambling the DCI control information, the network device may send the scrambled DCI control information to the terminal device.

803: Determine, when a value of the first field is a first preset value, a first type identifier based on indication information of the second field, where an AI operation identifier identifies the type of the AI operation.

In this example, after receiving the scrambled DCI control information sent by the network device, the terminal device descrambles the scrambled DCI control information to obtain the descrambled DCI control information.

In addition, the first preset value can reflect that the terminal device needs to perform the AI operation, but a specific AI operation to be performed needs to be determined by the terminal device based on the indication information of the second field. Therefore, after obtaining the descrambled DCI control information, the terminal device may detect the first field in the DCI control information. When the value of the first field is the first preset value, the terminal device may determine the first type identifier based on the indication information of the second field.

It should be noted that the described first preset value may be 0. However, in actual application, the first preset value may also be another value that can indicate that the terminal device needs to perform an AI operation. This is not limited herein.

Optionally, in some other embodiments, the determining, when a value of the first field is a first preset value, a first type identifier based on indication information of the second field includes: interpreting, when the value of the first field is the first preset value, the indication information of the second field based on a preset interpretation manner, to determine the first type identifier.

The described preset interpretation manner may be understood with reference to the following manners:

a first manner: AI-operation ID, 5 bits;

Reserved bits, 22 bits;

alternatively, a second manner:

AI-operation ID, 5 bits;

Active-time, the time offset for performing an operation, which unit may be slot, SFN, millisecond, or the like, 5 bits;

Reserved bits, 17 bits;

alternatively, a third manner:

AI-operation ID, 5 bits;

Active-time, the time offset for performing an operation, which unit may be slot, SFN, millisecond, or the like, 5 bits;

Time-frequency-resource, a time-frequency resource location (for example, a backhaul gradient, a model parameter, or the like) required for performing the operation, 10 bits;

Reserved bits, 7 bits;

It should be noted that, in addition to the foregoing three described interpretation manners, the preset interpretation manner may be another interpretation manner in actual application. This is not limited herein.

804: The terminal device starts an AI operation based on the first type identifier.

In this example, after determining the first type identifier, the terminal device may start the AI operation based on the first type identifier.

In the foregoing manner, the network device reuses the DCI control information, so that a single terminal device can be triggered. In this way, the terminal device that is already in the offline state participates in optimization of a network AI capability, thereby improving network performance.

The foregoing mainly describes the solutions provided in embodiments of this application from the perspective of the methods. It may be understood that, to implement the foregoing functions, the terminal device and the network device include corresponding hardware structures and/or software modules for performing the functions. A person skilled in the art should be easily aware that, in combination with the functions described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of functional units, in this application, the network device and the terminal device may be divided into functional units based on the foregoing method embodiments. For example, each functional unit may be obtained through division based on each corresponding function, or two or more functions may be integrated into one functional unit. The integrated functional unit may be implemented in a form of hardware, or may be implemented in a form of a software functional unit.

For example, when functional units are divided in a manner of integration, FIG. **9*a*** is a schematic diagram of a structure of a terminal device according to an embodiment of this application. The described terminal device may include:

an obtaining module 901, configured to obtain a first group identifier, where the first group identifier indicates a user group in which the terminal device is located, where the obtaining module 901 is configured to obtain a trigger message sent by a network device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and Nis an integer; and a processing module 902, configured to determine target AI operation information when the first group identifier matches a target group identifier, where the target group identifier is any one of N second group identifiers of the N pieces of first scheduling information, where the processing module 902 is configured to start a target AI operation based on the target AI operation information.

Optionally, in some examples, the processing module 902 is further configured to ignore the N pieces of first scheduling information when the first group identifier does not match any one of the N second group identifiers.

Optionally, in some embodiments, the processing module 902 is further configured to descramble, before determining the target AI operation information, the first control information based on a preset AI operation identifier.

Figure 9A:
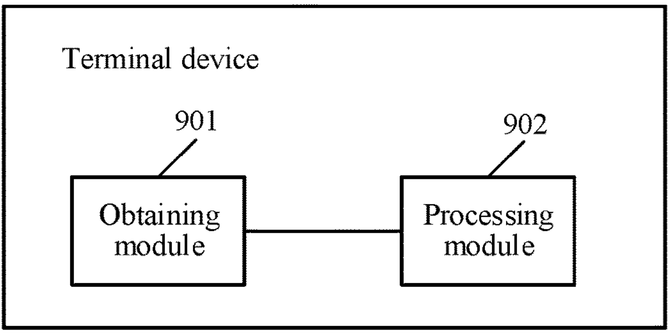
FIG. 9*a* is a schematic diagram of a structure of a terminal device according to an embodiment of this application.
Figure 9B:
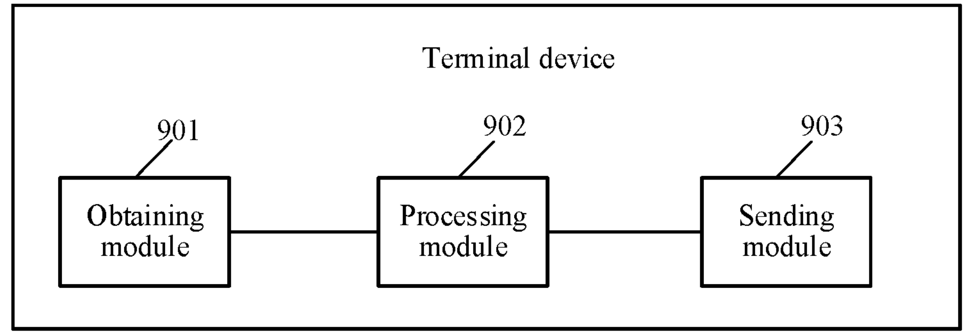
FIG. 9*b* is a schematic diagram of a structure of another terminal device according to an embodiment of this application.

Optionally, in some examples, on the basis of FIG. 9*a* and the optional examples, FIG. 9*b* is a schematic diagram of a structure of another terminal device according to an embodiment of this application. The terminal device may further include: a sending module 903;

the sending module 903, configured to send geographical location information of the terminal device and/or first capability information of the terminal device to the network device before the first group identifier is obtained, where the first capability information reflects a capability support status of the terminal device; and the obtaining module 901, configured to receive a first group identifier sent by the network device, where the first group identifier is determined by the network device based on the geographical location information and/or the first capability information.

Optionally, in some examples, the obtaining module 901 is further configured to:

receive, before obtaining the first group identifier is obtained, M trigger events or M correspondences sent by the network device, where the M correspondences are relationships between the M trigger events and M user group identifiers, each of the M trigger events corresponds to one user group identifier, M≥1, and M is an integer; and obtain the first group identifier based on an event type of the terminal device and the M trigger events; or obtain the first group identifier based on an event type of the terminal device and the M correspondences.

Optionally, in some examples, the AI operation corresponding to the AI operation information includes performing model uploading or performing channel data collection.

Figure 10A:
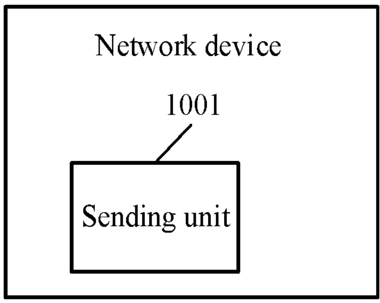
FIG. 10*a* is a schematic diagram of a structure of a network device according to an embodiment of this application.

The foregoing mainly describes a structure of the terminal device. The following describes the network device described above from a perspective of functional units. For example, when the functional units are divided in a manner of integration, FIG. 10*a* is a schematic diagram of a structure of a network device according to an embodiment of this application. The network device may include:

a sending unit 1001, configured to send a first group identifier, and M trigger events or M correspondences to a terminal device, where the M correspondences are relationships between the M trigger events and M user group identifiers, the M trigger events are used by the terminal device to determine the first group identifier, the first group identifier indicates a user group in which the terminal device is located, each of the M trigger events corresponds to one user group identifier, M≥1, and M is an integer, where the sending unit 1001 is configured to send a trigger message to the terminal device, where the trigger message includes first control information, the first control information indicates a first time-frequency resource, the first time-frequency resource carries N pieces of first scheduling information, each of the N pieces of first scheduling information includes a respective second group identifier and AI operation information, a terminal device in a user group indicated by the second group identifier needs to perform an AI operation corresponding to the AI operation information, N≥1, and N is an integer.

Figure 10B:
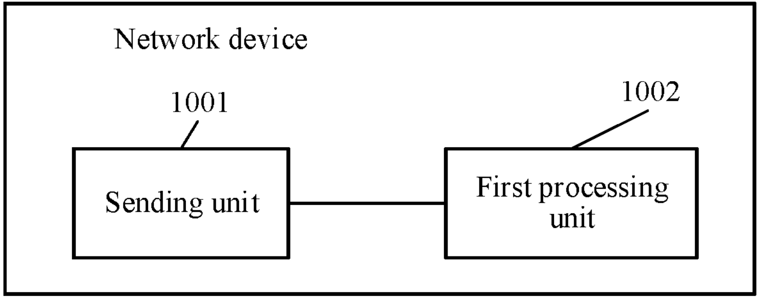
FIG. 10*b* is a schematic diagram of a structure of another network device according to an embodiment of this application.

Optionally, in some examples, based on FIG. 10*a*, FIG. 10*b* is a schematic diagram of a structure of another network device according to an embodiment of this application. The network device may further include a first processing unit 1002, configured to scramble the first control information based on a preset AI operation identifier.

Optionally, in some examples, on the basis of FIG. 10*a* or FIG. 10*b*, the network device may further include:

a receiving unit, configured to receive, before the first group identifier is sent to the terminal device, geographical location information of the terminal device and/or first capability information of the terminal device sent by the terminal device, where the first capability information reflects a capability support status of the terminal device; and a second processing unit, configured to determine the first group identifier based on the geographical location information and/or the first capability information.

In some optional examples, the trigger events include that a user local model is invalid, a user local model expires, and/or user local training data is invalid.

It should be noted that, content such as information exchange between the modules/units of the apparatus and the execution processes thereof is based on the same idea as the method embodiments of this application, and produces the same technical effects as the method embodiments of this application. For specific content, refer to the foregoing descriptions in the method embodiments of this application. Details are not described herein again.

The foregoing describes the terminal device and the network device in embodiments of this application from a perspective of a modular functional entity. From a perspective of physical devices, the terminal device and the network device may be implemented by one physical device, or may be implemented by a plurality of physical devices together, or may be a logical function unit in one physical device. This is not specifically limited in this embodiment of this application.

Figure 11:
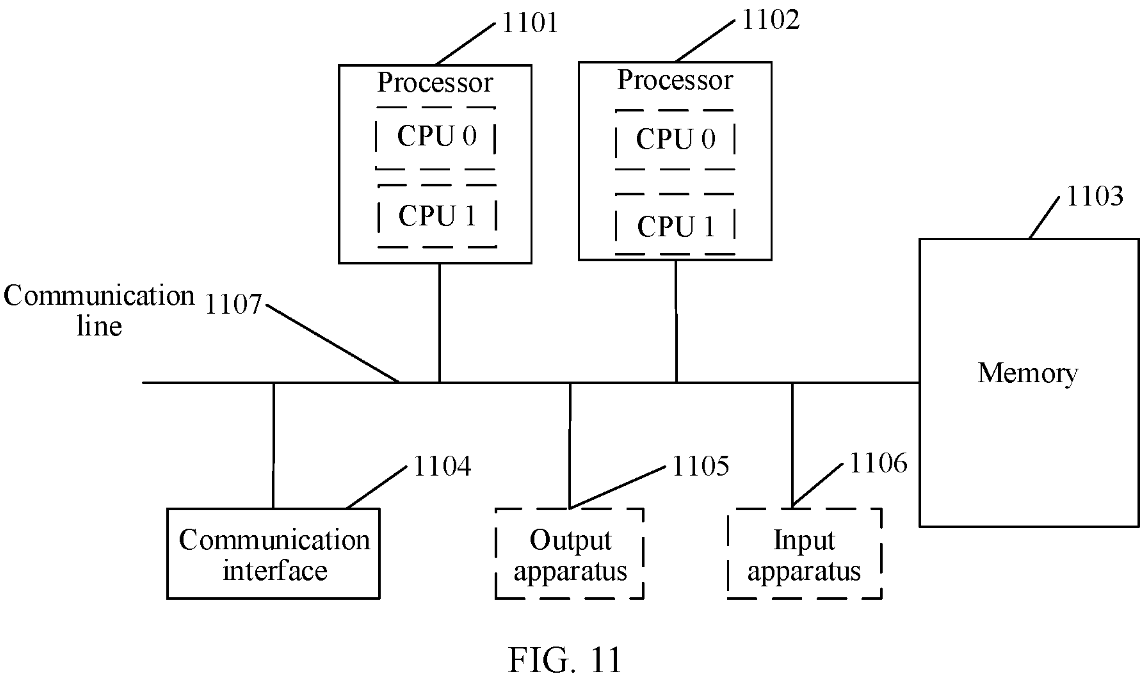
FIG. 11 is a schematic diagram of a structure of hardware of a communication device according to an embodiment of this application.

For example, a first terminal device, a first device, and a second device may be implemented by a communication device in FIG. 11. FIG. 11 is a schematic diagram of a hardware structure of a communication device according to an embodiment of this application. The communication device includes at least one processor 1101, a communication line 1107, a memory 1103, and at least one communication interface 1104.

The processor 1101 may be a general-purpose central processing unit (CPU), a microprocessor, an application-specific integrated circuit (ASIC), or one or more integrated circuits configured to control program execution of the solutions in this application.

The communication line 1107 may include a path for transmitting information between the foregoing components.

The communication interface 1104 is an apparatus such as any transceiver, and is configured to communicate with another apparatus or a communication network, for example, the Ethernet.

The memory 1103 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 1103 is not limited thereto. The memory may be independent, and is connected to the processor through the communication line 1107. The memory 1103 may alternatively be integrated with the processor 1101.

The memory 1103 is configured to store computer-executable instructions for executing the solutions of this application, and the processor 1101 controls execution of the computer-executable instructions. The processor 1101 is configured to execute the computer-executable instructions stored in the memory 1103, to implement the AI operation processing method provided in the foregoing embodiments of this application.

Optionally, the computer-executable instructions in embodiments of this application may also be referred to as application program code. This is not specifically limited in embodiments of this application.

In specific implementations, in an embodiment, the processor 1101 may include one or more CPUs such as a CPU 0 and a CPU 1 in FIG. 11.

During specific implementation, in an embodiment, a communication apparatus may include a plurality of processors, for example, the processor 1101 and a processor 1102 in FIG. 11. Each of the processors may be a single-core (single-CPU) processor, or may be a multi-core (multi-CPU) processor. The processor herein may be one or more apparatuses, circuits, and/or processing cores configured to process data (such as computer program instructions).

In specific implementations, in an embodiment, the communication apparatus may further include an output apparatus 1105 and an input apparatus 1106. The output apparatus 1105 communicates with the processor 1101, and may display information in a plurality of manners. The input apparatus 1106 communicates with the processor 1101, and may receive user input in a plurality of manners. For example, the input apparatus 1106 may be a mouse, a touchscreen apparatus, a sensing apparatus, or the like.

The communication apparatus may be a general-purpose apparatus or a dedicated apparatus. In specific implementations, the communication apparatus may be a portable computer, a mobile terminal, or the like, or an apparatus having a structure similar to that in FIG. 11. A type of the communication apparatus is not limited in embodiments of this application.

It should be noted that the processor 1101 in FIG. 11 may invoke the computer-executable instructions stored in the memory 1103, so that the terminal device performs the methods performed by the terminal device in the method embodiments corresponding to FIG. 4 to FIG. 8. The processor 1101 in FIG. 11 may invoke the computer-executable instructions stored in the memory 1103, so that the network device performs the methods performed by the network device in the method embodiments corresponding to FIG. 4 to FIG. 8.

Specifically, the processing module 902 in FIG. 9*a*, the first processing unit 1002 in FIG. 10*b*, and the function/implementation process of the second processing unit may be implemented by the processor 1101 in FIG. 11 by invoking the computer-executable instructions stored in the memory 1103. The obtaining module 901 in FIG. 9*a*, the sending module 903 in FIG. 9*b*, and the sending unit 1001 in FIG. 10*a*, and the function/implementation process of the receiving unit may be implemented by the communication interface 1104 in FIG. 11.

All or some of the foregoing embodiments may be implemented by using software, hardware, firmware, or any combination thereof. When software is used to implement embodiments, all or some of embodiments may be implemented in a form of a computer program product.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technologies, or all or some of the technical solutions may be implemented in the form of a software product. The computer software product is stored in a storage medium and includes several instructions for indicating a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The foregoing embodiments are merely intended for describing the technical solutions of this application, but not for limiting this application. Although this application is described in detail with reference to the foregoing embodiments, a person of ordinary skilled in the art should understand that modifications may still be made to the technical solutions described in the foregoing embodiments or equivalent replacements may be made to some technical features, and such modifications or replacements do not cause the essence of the corresponding technical solutions to depart from the spirit and scope of embodiments of this application.

What is claimed is:

1. An artificial intelligence (AI) operation processing method, wherein the AI operation processing method is applied to a terminal device and comprises:

obtaining a first group identifier, wherein the first group identifier indicates a user group in which the terminal device is located;

obtaining a trigger message sent by a network device, wherein the trigger message comprises first control information, the first control information indicates a first time-frequency resource, the first time-frequency resource carries N pieces of first scheduling information, each of the N pieces of first scheduling information comprises a respective second group identifier and respective AI operation information and indicates a terminal device in a user group indicated by the respective second group identifier to perform an AI operation corresponding to the respective AI operation information, N≥1, and Nis an integer;

determining target AI operation information when the first group identifier matches a target group identifier, wherein the target group identifier is any one of N second group identifiers of the N pieces of first scheduling information; and starting a target AI operation based on the target AI operation information.

2. The AI operation processing method according to claim 1, wherein the AI operation processing method further comprises:

ignoring the N pieces of first scheduling information when the first group identifier does not match any one of the N second group identifiers.

3. The AI operation processing method according to claim 1, wherein before determining the target AI operation information, the AI operation processing method further comprises:

descrambling the first control information based on a preset AI operation identifier.

4. The AI operation processing method according to claim 1, wherein before obtaining the first group identifier, the AI operation processing method further comprises:

sending at least one of geographical location information of the terminal device or first capability information of the terminal device to the network device, wherein the first capability information reflects a capability support status of the terminal device; and wherein obtaining the first group identifier comprises:

receiving a first group identifier sent by the network device, wherein the first group identifier is determined by the network device based on at least one of the geographical location information or the first capability information.

5. The AI operation processing method according to claim 1, wherein before obtaining the first group identifier, the AI operation processing method further comprises:

receiving M trigger events or M correspondences sent by the network device, wherein the M correspondences are relationships between the M trigger events and M user group identifiers, each of the M trigger events corresponds to one user group identifier, M≥1, and M is an integer; and wherein obtaining the first group identifier comprises:

obtaining the first group identifier based on an event type of the terminal device and one of the M trigger events and the M correspondences.

6. The AI operation processing method according to claim 1, wherein the AI operation comprises performing model uploading or performing channel data collection.

7. An artificial intelligence (AI) operation processing method, wherein the AI operation processing method is applied to a network device and comprises:

sending, to a terminal device, a first group identifier, M trigger events, or M correspondences, wherein the M correspondences are relationships between the M trigger events and M user group identifiers, the M trigger events or the M correspondences are used by the terminal device to determine the first group identifier, the first group identifier indicates a user group in which the terminal device is located, each of the M trigger events corresponds to one user group identifier, M≥1, and M is an integer; and sending a trigger message to the terminal device, wherein the trigger message comprises first control information, the first control information indicates a first time-frequency resource, the first time-frequency resource carries N pieces of first scheduling information, each of the N pieces of first scheduling information comprises a respective second group identifier and respective AI operation information and indicates a terminal device in a user group indicated by the respective second group identifier to perform an AI operation corresponding to the respective AI operation information, N≥1, and Nis an integer.

8. The AI operation processing method according to claim 7, wherein the AI operation processing method further comprises:

scrambling the first control information based on a preset AI operation identifier.

9. The AI operation processing method according to claim 7, wherein before sending, to the terminal device, the first group identifier, the AI operation processing method further comprises:

receiving at least one of geographical location information of the terminal device or first capability information of the terminal device sent by the terminal device, wherein the first capability information reflects a capability support status of the terminal device; and determining the first group identifier based on at least one of the geographical location information or the first capability information.

10. The AI operation processing method according to claim 7, wherein the M trigger events comprise at least one of that a user local model is invalid, that a user local model expires, or that user local training data is invalid.

11. A terminal device, comprising:

at least one processor; and at least one memory coupled to the at least one processor and storing programming instructions for execution by the at least one processor to cause the terminal device to perform operations comprising:

obtaining a first group identifier, wherein the first group identifier indicates a user group in which the terminal device is located;

obtaining a trigger message sent by a network device, wherein the trigger message comprises first control information, the first control information indicates a first time-frequency resource, the first time-frequency resource carries N pieces of first scheduling information, each of the N pieces of first scheduling information comprises a respective second group identifier and respective AI operation information and indicates a terminal device in a user group indicated by the respective second group identifier to perform an AI operation corresponding to the respective AI operation information, N≥1, and N is an integer;

determining target AI operation information when the first group identifier matches a target group identifier, wherein the target group identifier is any one of N second group identifiers of the N pieces of first scheduling information; and starting a target AI operation based on the target AI operation information.

12. The terminal device according to claim 11, wherein the operations further comprise:

ignoring the N pieces of first scheduling information when the first group identifier does not match any one of the N second group identifiers.

13. The terminal device according to claim 11, wherein the operations further comprise:

descrambling, before determining the target AI operation information, the first control information based on a preset AI operation identifier.

14. The terminal device according to claim 11, wherein the operations further comprise:

sending, before obtaining the first group identifier, at least one of geographical location information of the terminal device or first capability information of the terminal device to the network device, wherein the first capability information reflects a capability support status of the terminal device; and wherein obtaining the first group identifier comprises:

receiving a first group identifier sent by the network device, wherein the first group identifier is determined by the network device based on at least one of the geographical location information or the first capability information.

15. The terminal device according to claim 11, wherein the operations further comprise:

receiving, before obtaining the first group identifier, M trigger events or M correspondences sent by the network device, wherein the M correspondences are relationships between the M trigger events and M user group identifiers, each of the M trigger events corresponds to one user group identifier, M≥1, and M is an integer; and wherein obtaining the first group identifier comprises:

obtaining the first group identifier based on an event type of the terminal device and one of the M trigger events and the M correspondences.

16. The terminal device according to claim 11, wherein the AI operation comprises performing model uploading or performing channel data collection.

* * * * *